April 13, 1948.  A. MACKMANN  2,439,479
UNIVERSAL COUPLING
Filed Nov. 16, 1942
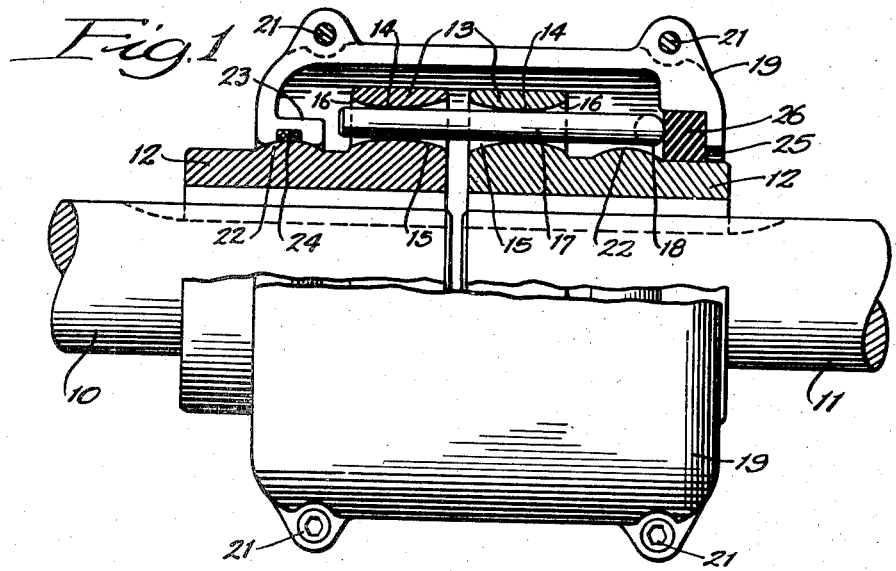
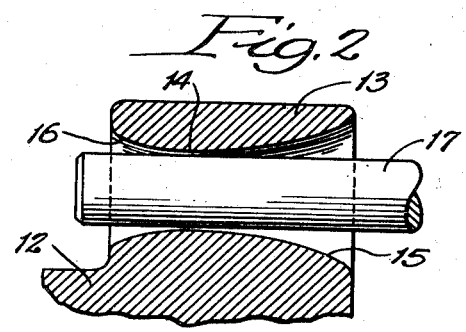
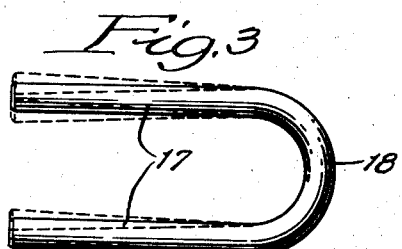
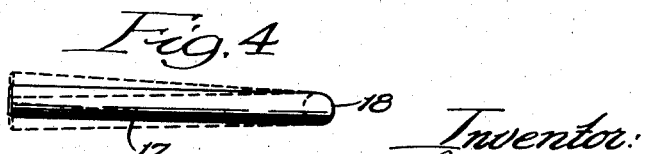
Inventor:
Arthur Mackmann,
By Dawson, Ooms & Booth
Attorneys.

Patented Apr. 13, 1948

2,439,479

UNITED STATES PATENT OFFICE 2,439,479

UNIVERSAL COUPLING

Arthur Mackmann, Chicago, Ill.

Application November 16, 1942, Serial No. 465,645

5 Claims. (Cl. 64—10)

This invention relates to universal couplings and more particularly to couplings for connecting shafts to transmit torque therebetween while permitting angular and/or parallel misalinement thereof and/or relative endwise float.

One of the objects of the invention is to provide a universal coupling which is small, compact, simple to manufacture and assemble and which includes a minimum number of different parts. According to one feature of the invention, all parts of the coupling may be made of metal so that no rubber, leather, or other composite materials are required, except, possibly, where yielding seals are employed.

Another object of the invention is to provide a universal coupling which forms a positive driving connection between the shafts while permitting substantial angular and/or parallel misalinement.

Still another object of the invention is to provide a universal coupling including a fluid-tight casing which positively excludes foreign materials and which may, if desired, contain a lubricant. One feature of the invention relates to a seal construction by which the casing may be sealed tightly yet movable to the shaft part.

A still further object of the invention is to provide a universal coupling in which the parts are connected by rigid pins operating in curved tapered openings to provide a rolling wedge action.

A further object of the invention is to provide a universal coupling in which the parts are connected by U-shaped connector members whose legs act as rigid pins flexibly connected by the loop portion.

The above and other objects and advantages of the invention will be more readily apparent from the following description when read in connection with the accompanying drawing, in which—

Figure 1 is an elevation with parts in section of a coupling embodying the invention;

Figure 2 is an enlarged detail section through one of the openings;

Figure 3 is a plan view of a connecting pin; and

Figure 4 is a side view of the connecting pin.

The coupling of Figure 1 is shown connecting two coaxial shafts 10 and 11, one of which may be a motor shaft and the other a shaft to be driven thereby. Such shafts are normally substantially coaxial but are subject to a certain amount of angular and parallel misalinement and to end float due to inaccuracies in the mounting means or to other causes. The coupling of the invention is therefore provided to permit transmission of torque between the shafts regardless of such misalinement without causing binding in the supporting bearings.

As shown, the coupling comprises identical connector members including hub portions 12 surrounding and keyed to the shafts 10 and 11 respectively and flange portions 13 which are arranged adjacent the ends of the shafts in facing relationship. The flange portions 13 are provided with a series of circumferentially spaced openings, which, as best seen in Figure 2, are formed with portions 14 of minimum diameter intermediate their ends and with outwardly flaring portions 15 and 16 at the forward and rear ends respectively of the flange portions. Both of the flared portions 15 and 16 are formed on a convex curve so as to provide convex inner surfaces in the opening, the portion 15 preferably being somewhat flatter and longer than the portion 16 as shown. The flare of these portions preferably follows a parabolic curve, since this provides the preferred action although, if desired, the curve could be arcuate or have some similar shape.

The flange portions 13 are drivably connected by means of elongated pins extending through the alined openings therein. The pins as best shown in Figure 3, are formed in a U-shape with straight rigid leg portions 17 connected by an integral arcuate loop portion 18. The pins are preferably of slightly smaller diameter than the minimum diameter portion of the openings in the flanges to provide clearance therebetween, as shown in Figure 2.

The legs 17 of the connecting pins are preferably slightly out of parallel, such as would normally occur with loops not accurately formed, so that when they are assembled in the openings in the flanges they will bear against the sides of the adjacent openings. Thus any relative motion of the flanges or of the pins relative to the flanges will be resisted by the resiliency of the loop portions 18 to eliminate rattle. However, the effective leverage on the loop portion 18 due to forces acting on the legs 17 is such that flexing of the loop portion is effective only to prevent rattle or chatter and not to transmit load.

In installing a coupling the shafts may be accurately alined by alining the exterior surfaces of the flanges 13 which are both smooth and of the same size and configuration. By turning the flanges until the openings therein are alined the pins may be inserted with the legs 17 of a pin passing through adjacent sets of openings. Due to the connection of two pins by an integral loop the pins can be handled easily and the loop engages the flange to position the pins longitudinally in the openings.

As torque is transmitted between the flanges each of the pins will cock until it wedges or binds in the openings and transmits torque. Since each pin is bounded on all sides by identical surfaces all of the pins will act to transmit torque at all times and each pin will carry its proportionate share of the load. Thus a minimum number and size of pins may be employed to transmit a given torque. It will be noted, however, that each pin acts independently of the others and assumes a position required by the relative positions of the openings through which it passes. Each pin furthermore changes its position in its openings as required without separation from the sides of the openings to provide a rolling wedge action with the continuous torque transmission.

During initial relative motion between the flanges the loop portions of the pins will be flexed to hold the leg or pin portions in engagement with the sides of the openings to prevent rattle or chatter. There may also be some longitudinal sliding of the pins in the openings at this time. After the flanges have turned relatively enough so that the pins wedge in the openings the loops will continue to be flexed as the pins operate with their rolling wedge action. This flexure is both in the plane of the pins as indicated in dotted lines in Figure 3 and in twist or torsion as indicated in dotted lines in Figure 4. In both cases the flexure acts to damp out any tendency of the coupling to chatter so that a quiet, smooth, running coupling is provided. A certain amount of axial float between the shafts and flanges is also permitted since the flanges are free to slide over the pins longitudinally. Thus the coupling is completely free in all directions.

The coupling of the present invention can be designed to provide substantially any desired amount of backlash and to accommodate substantially any desired amount of misalinement by proportioning the length and degree of curvature of the openings, the amount of clearance around the pins and the spacing of the flanges. By "backlash" as used in connection with the present coupling is meant the relative permissible movement between the coupling parts before wedging of the pins occurs and full torque is transmitted. In the present coupling, however, the loop portions of the pins will be flexed and the pins will roll on the convex surfaces of the openings to prevent chatter and rattle during the backlash motion.

The coupling may be enclosed in a casing formed of two identical halves 19 of any desired configuration connected together by screws 21. The ends of the casing overlie the hub portions 12 and are adapted to be sealed against these portions to prevent entry of foreign material and so that, if desired, the coupling may operate in a body of lubricant, it being understood that the coupling may operate either dry or in lubricant. For this purpose, the sleeve portions 12 of the connecting members are formed with partispherical projections 22 and one end of the casing is shaped to fit slidably over such projections. As shown in Figure 1, this end of the casing is formed with an enlargement 23 having a concave inner surface formed with a groove in which an oil pad 24 is mounted. The groove in the enlargement 23 provides a thin walled section giving a springy or yielding action to the sealing surface and provides an oil trap. This springy action insures that the surface will form a tight seal against the projection 22 without interfering with universal sliding movement. The oil pad 24 may be used when desired to assist in maintaining an oil film between the surfaces to prevent direct metal-to-metal contact but is not necessary.

The opposite end of the casing is of larger diameter than the corresponding sleeve 12 to provide clearance therebetween as indicated at 25. A yielding packing 26 of rubber or the like is carried by this end of the casing and engages the outer surface of the sleeve beyond the spherical projection 22 thereon. The packing 26 is adapted to yield when the shafts are out of alinement while maintaining a relatively tight seal against the sleeve.

With this seal construction, the seal formed between the spherical portion 22 and the sealing means 23—24 carried by the casing is extremely tight so that the coupling may be operated in a vertical position with this seal down and with the casing full of lubricant. Due to the tightness of this seal, leakage of lubricant will be prevented in this manner without in any way interfering with freedom of action of the coupling. Furthermore, the seal formed by the enlargement 23 is rigid radially so that proper concentricity and centrifugal balance of the casing may be maintained to minimize vibration and wear. Since the enlargements 22 are identical on both hubs, the casing can be easily and quickly reversed and the pins can also be reversed to keep the loops up and to keep the seal 22—23 down. Thus its effective position can be reversed without disturbing the flanges or shafts.

It will be noted from Figure 1 that the loop portion 18 of the connecting pins bears against the yielding seal 26 so that an axial movement of the pins to the right, as seen in Figure 1, is prevented. Axial movement in the opposite direction is prevented by engagement of the loop portion of the pins with the flange 13 so that axial movement of the pins relative to the flanges is positively limited. This can readily be accomplished without interfering with floating of the coupling since the flanges may move axially relative to each other to a limited extent without interference. Since the rounded end of the loop portions of the pins engages the yielding packing 26 any tendency to rattle due to movement of the pins is damped.

The principal function of the casing in the present construction, aside from limiting lengthwise motion of the pins in one direction, is to inclose the working parts of the coupling and possibly to hold a lubricant. The pins are supported radially entirely by the flanges and do not exert any centrifugal load on the casing so that the casing can be light and need not be accurately formed. This contributes not only to minimum size and cost but also enables a pleasing appearance to be provided.

While one embodiment of the invention has been shown and described in detail, it will be understood that this is illustrative only and is not intended as a definition of the scope of the invention, references being had for this purpose to the appended claims.

What is claimed is:

1. A universal coupling for connecting coaxial shafts comprising means carried by the adjacent ends of the shafts to provide a universally movable driving connection therebetween, a hollow casing inclosing said means with its ends encircling the shafts, means on one of the shafts adjacent the corresponding end of the casing forming a parti-spherical surface, sealing means carried by said end of the casing shaped to fit against and slide over said surface, the opposite end of the casing being larger than the shaft part it surrounds to provide clearance for relative angular movement, and resilient sealing means between said opposite end of the casing and said shaft part.

2. A universal coupling for connecting coaxial shafts comprising like connector members having hub portions fitting around the shafts and radially extending flanges, the hub portions being formed on their exterior with parti-spherical surfaces, means for drivably connecting the flange portions so constructed and arranged as to provide universal movement therebetween, a casing inclosing the flange portions with its ends encircling the hub portions, one end of the casing being formed to fit slidably over and to seal against the spherical surface of the adjacent hub, the other end of the casing fitting loosely around its adjacent hub, and a yielding seal between said other end of the casing and the adjacent hub.

3. A universal coupling for connecting coaxial shafts comprising like connector members having hub portions fitting around the shafts and radially extending flanges, the hub portions being formed on their exterior with parti-spherical surfaces, a casing inclosing the flange portions with its ends encircling the hub portions, one end of the casing being formed to fit slidably over and to seal against the spherical surface of the adjacent hub, the other end of the casing fitting loosely around its adjacent hub, and a yielding seal between said other end of the casing and the adjacent hub, the flange portions having alined openings therein, and a U-shaped connecting member extending through the openings, the loop end of the connecting member resting against the yielding seal yieldingly to limit cushion lengthwise movement thereof.

4. A universal coupling for connecting coaxial shafts comprising like connector members having hub portions fitting around the shafts and radially extending flanges, the hub portions being formed on their exterior with parti-spherical surfaces, a casing inclosing the flange portions with its ends encircling the hub portions, one end of the casing being formed to fit slidably over and to seal against the spherical surface of the adjacent hub, the other end of the casing fitting loosely around its adjacent hub, and a yielding seal between said other end of the casing and the adjacent hub, the flange portions having alined openings therein formed with central portions of minimum diameter and end portions flaring convexly outward therefrom, and a U-shaped connecting member extending through the openings and fitting loosely in the portions of minimum diameter, the loop end of the connecting member resting against the yielding seal to limit lengthwise movement thereof.

5. A universal coupling comprising driving and driven flange members in facing and substantially coaxial relationship, the flange members being formed with normally alined openings of substantially circular section having a central portion of minimum diameter and flaring outwardly in opposite directions therefrom, and U-shaped connecting members having substantially rigid cylindrical legs extending through the openings and of smaller diameter than the minimum diameter of the openings, the legs initially being slightly out of parallel to engage the sides of the openings the portions of minimum diameter being of such length relative to their diameter that the legs may tilt therein to engage the flaring portions without bending the legs.

ARTHUR MACKMANN.

REFERENCES CITED

The following references are of record in the file of this patent:

UNITED STATES PATENTS

| Number | Name | Date |
| --- | --- | --- |
| 1,262,406 | Taylor et al. | Apr. 9, 1918 |
| 1,272,758 | Young | July 16, 1918 |
| 1,394,184 | Morse | Oct. 18, 1921 |
| 1,687,035 | Newhouse | Oct. 9, 1928 |
| 1,936,573 | Anger | Nov. 28, 1933 |
| 2,181,537 | Schmitter | Nov. 28, 1939 |

FOREIGN PATENTS

| Number | Country | Date |
| --- | --- | --- |
| 154,136 | Great Britain | Nov. 25, 1920 |
| 301,865 | Great Britain | Feb. 3, 1930 |
| 344,139 | Great Britain | Mar. 5, 1931 |
| 439,966 | Great Britain | Dec. 18, 1935 |
| 515,424 | Germany | Jan. 3, 1931 |